United States Patent [19]

Hirota et al.

[11] Patent Number: 4,836,840
[45] Date of Patent: Jun. 6, 1989

[54] PRESS-MOLDING DEVICE FOR LENSES

[75] Inventors: Shinichiro Hirota, Hachioji; Kishio Sugawara, Hamura, both of Japan

[73] Assignee: Hoya Corporation, Tokyo, Japan

[21] Appl. No.: 249,874

[22] Filed: Sep. 26, 1988

[51] Int. Cl.⁴ .................................... C03B 11/08
[52] U.S. Cl. ............................ 65/323; 65/37; 65/106; 65/275; 65/286; 65/308; 65/321
[58] Field of Search ............ 65/106, 321, 323, 308, 65/305, 286, 275, 37

[56] References Cited

U.S. PATENT DOCUMENTS

| 810,375 | 1/1906 | Myers | 65/308 |
| 3,244,497 | 4/1966 | Copeland | 65/308 |
| 4,734,118 | 3/1988 | Marechal et al. | 65/275 X |

FOREIGN PATENT DOCUMENTS

| 118642 | 6/1985 | Japan | 65/305 |
| 1021926 | 1/1986 | Japan | 65/323 |

Primary Examiner—Arthur Kellogg
Attorney, Agent, or Firm—Nixon & Vanderhye

[57] ABSTRACT

In a press-molding device for lenses, an upper surface of a drag is formed into a molding surface, and a lower surface of a cope is formed into a molding surface. An inner peripheral surface of a guide mold portion is in contact with an outer peripheral surface of the drag, and has an axial length longer than that of the outer peripheral surface of the drag so that the inner peripheral surface extends upwardly from the molding surface of the drag. The cope is capable of sliding along the inner peripheral surface. A pressure plate is in contact with an upper surface of the cope before pressing, and is abutted against the upper surface of the guide mold portion by the pressing. A glass preform to be molded is arranged between the molding surfaces of the respective cope and drag. The cope is pressed from above through the pressure plate, thereby molding the glass preform to a lens. The guide mold portion may be divided into a pair of upper and lower portions.

7 Claims, 3 Drawing Sheets

PRESS-MOLDING DEVICE FOR LENSES

BACKGROUND OF THE INVENTION

The present invention relates to a press-molding device for molding lenses which are less in tilt of their respective optical axes and in shift or deviation of the optical axes.

In recent years, studies and researches have been conducted extensively, in which glass preform is press-molded to manufacture an optical lens directly.

A molding device for carrying out the above processing is known from, for example, Japanese Patent Application Laid-Open No. 60-118640. The molding device comprises a sleeve having a peripheral wall formed therein with a takeout opening, and a pair of cope and drag or upper and lower mold portions slidably accommodated in the sleeve. A ring-like mold portion, to which a glass preform is mounted, is inserted into the sleeve through the takeout opening. The glass preform is press-molded within the ring-like mold portion by the cope and drag.

The above-mentioned device has the following problem. That is, a clearance of the order of 4 to 10 micrometers is required between the cope and drag and the sleeve in order to enable the cope and drag to slide within the sleeve. Because of the clearance, the cope and drag tilt with respect to the sleeve at the pressing. In case of an aspheric lens for which severity is requested in connection with a tilt of its optical axis, the cope and drag and the sleeve must be lengthened considerably to reduce the tilt. This results in a increase of the overall dimension of the device. Further, since the arrangement of the device is such that the cope and drag are fitted from above and below into the ring-like mold portion inserted into the sleeve, it is essential that a certain measure of clearance is provided between the cope and drag and the ring-like mold portion. Thus, it is difficult from the viewpoint of the fundamental construction to reduce the tilt of the optical axis of the lens and to bring the optical axis of the lens in conformity with a central axis thereof.

On the other hand, a lens having opposite aspheric faces has been developed as a lens of a pickup for a compact disc. The lens is extremely small such as 5 to 8 mm in outer diameter and, accordingly, high accuracy or precision is required for the lens faces, the eccentricity, and the central thickness. In case of a spherical lens, an eccentricity that is deviation of an optical axis of the lens with respect to a central axis thereof becomes a problem. In case of a lens having opposite aspheric faces having their respective central axes, however, a tilt between both the central axes and deviation or decentering between both the central axes become a problem. If an attempt is made to obtain a lens for the compact disc whose wave front aberration is within a range of $0.04\lambda$ rms where $\lambda$ is the wavelength, it is necessary to restrain the tilt to a value within sixty (60) seconds, and the decentering to a value within 10 micrometers. In addition, it is required to restrain the thickness accuracy to a value within $\pm 15$ micrometers.

It is difficult for the conventional device, however, to obtain the above-mentioned lens. Thus, it has been desired to mold such lens by means of a device simple in construction.

SUMMARY OF THE INVENTION

It is therefore an object of the invention to provide a press-molding device for lenses, which is simple in construction and which can produce the lenses less in tilt and decentering between respective central axes of opposite faces of each lens.

According to the invention, there is provided a press-molding device for lenses, comprising:
- a drag having an upper surface formed into a molding surface;
- a cope having a lower surface formed into a molding surface, and an upper surface formed into a face substantially perpendicular to a vertical central axis of the cope;
- a guide mold portion having an inner peripheral surface in contact with an outer peripheral surface of the drag, the inner peripheral surface having an axial length longer than that of the outer peripheral surface of the drag so that the inner peripheral surface extends upwardly from the molding surface of the drag, the cope being capable of sliding along the inner peripheral surface, the guide mold portion having an upper surface formed into a face substantially perpendicular to a vertical central axis of the drag; and
- a pressure plate in contact with the upper surface of the cope before pressing, and capable of being abutted against the upper surface of the guide mold portion by the pressing, wherein a lens preform to be molded is arranged between the molding surfaces of the respective drag and cope, and the cope is pressed from above through the pressure plate, thereby molding the glass preform to a lens.

It is preferable that the drag is provided with a flange. The guide mold portion is mounted on an upper surface of the flange. Further, it is desirable that the cope is formed at a center of its upper surface with a projection. The pressure plate is formed at its center with a bore in which the projection is inserted. Preferably, the cope is provided at its outer peripheral surface with a step. The guide mold portion is provided at its inner peripheral surface with a step which cooperates with the step of the cope. Preferably, the guide mold portion is provided therein with air bleed means.

According to the invention, there is also provided a press-molding device for lenses, comprising:
- a drag having an upper surface formed into a molding surface;
- a lower guide mold portion having an inner peripheral surface in contact with the drag, the inner peripheral surface having an axial length longer than that of the drag so that the inner peripheral surface extends upwardly from the mold inner surface of the drag, the lower guide mold portion having an upper surface forced into a face substantially perpendicular to a vertical central axis of the drag;
- a cope having a lower surface formed into a molding surface, and an upper surface formed into a face substantially perpendicular to a vertical central axis of the cope, the cope being slidable within the lower guide mold portion;
- an upper guide mold portion having lower and upper surfaces formed parallel to each other, the cope being slidable within the upper guide mold portion;

a pressure plate having a lower surface in close contact with the upper surface of the cope and the upper surface of the upper guide mold portion; and guide means for guiding the upper guide mold portion with respect to the lower guide mold portion in such a manner that the vertical central axes of the respective drag and cope are aligned with each other, wherein a lens preform to be molded is arranged between the molding surfaces of the respective cope and drag, and the cope is pressed from above through the pressure plate, thereby molding the glass preform into a lens.

It is preferable that the press-molding device includes a plurality of sets of copes and drags. The plurality of sets are arranged in circumferentially spaced relation to each other about a central axis common to the upper and lower guide mold portions.

DETAILED DESCRIPTION

Figure 1A:
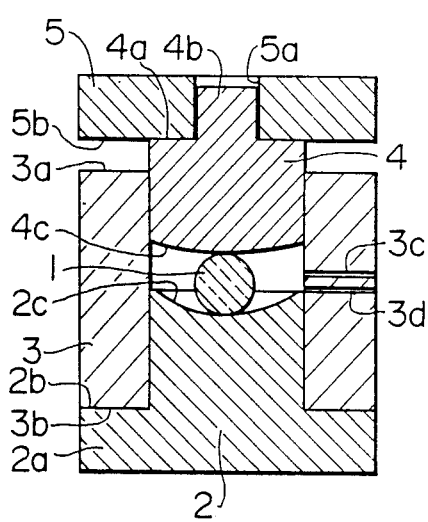
FIG. 1a is a cross-sectional view of a lens press-molding device according to an embodiment of the invention, showing the device before press-molding.
Figure 1B:
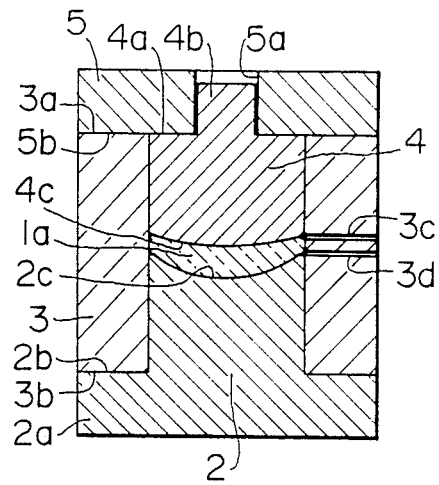
FIG. 1b is a view similar to FIG. 1a, but showing the device after the press-molding.

Referring first to FIGS. 1a and 1b, there is shown a lens press-molding device according to a first embodiment of the invention. FIG. 1a shows the device before press-molding of a glass preform 1 to be molded, while FIG. 1b shows the device after the press-molding.

The lens press-molding device comprises a columnar drag or a lower columnar mold portion 2 formed of tungsten carbide. The drag 2 has a lower section enlarged in diameter so that the lower section is formed into a flange 2a. The flange 2a has an upper surface 2b which is finished precisely into a smooth face perpendicular to a vertical central axis of the drag 2. The drag 2 has an upper surface which is formed into a molding surface 2c that is an aspheric concave face. The molding surface 2c is processed accurately such that an aspheric face axis is aligned with the vertical central axis of the drag 2. A guide mold portion 3 is cylindrical in shape and is formed of tungsten carbide. The guide mold portion 3 has a vertical or axial length longer than that of the drag 2. The drag 2 is fitted tightly in the guide mold portion 3 with a clearance of the order of 1 to 3 micrometers so that the guide mold 3 and the drag 2 are united together. The guide mold portion 3 has upper and lower surfaces 3a and 3b which are finished precisely respectively into smooth faces extending parallel to each other. The upper surface 2b of the flange 2a of the drag 2 and the lower surface 3b of the guide mold portion 3 are in close or intimate contact with each other so that the upper surface 3a of the guide mold portion 3 formed parallel to the lower surface 3b is formed perpendicularly to the vertical central axis of the drag 2. The guide mold portion 3 is formed at its vertically central portion with a pair of air bleeds 3c and 3d. A cope or an upper mold portion 4 is columnar in shape and is formed of tungsten carbide. The cope 4 has an upper surface 4a which is formed at its center with a projection 4b. A portion of the upper surface 4a except for the projection 4b is finished precisely into a smooth face perpendicular to a vertical central axis of the cope 4. The cope 4 has a lower surface which is formed into a molding surface 4c that is an aspheric convex face. The molding surface 4c is processed accurately such that an aspheric face axis of the molding surface 4c is brought into conformity with the vertical central axis of the cope 4. The cope 4 is fitted in the guide mold portion 3 with a clearance of, for example, 6 micrometers, as small as possible within a range in which the cope 4 can slide relative to the guide mold portion 3. A disc-like pressure plate 5 is also formed of tungsten carbide, and is formed at its center with a bore 5a in which the projection 4b of the cope 4 is fitted loosely. The pressure plate 5 has a lower surface 5b which is finished precisely into a smooth face superior in flatness.

A molding method employing the above-described molding device will next be described. With the cope 4 demounted from the guide mold portion 3, the glass preform 1 to be molded is placed on the molding surface 2c of the drag 2. The glass preform 1 is a spherical preform of SF6 which is a kind of optical glass and whose transition temperature is 435 degrees C. The spherical preform is 6 mm in diameter. Because of the concave molding surface 2c, the spherical glass preform 1 is arranged at the center of the molding surface 2c. In this manner, the glass preform 1 is located at the center of the molding surface 2c and, accordingly, is pressed at press-molding such that the glass preform 1 is spread radially outwardly. Thus, the molding is carried out smoothly and no bubbles are involved in the molded lens 1, making it possible to process the lens material 1 accurately or precisely. Subsequently, the cope 4 is fitted into the guide mold portion 3, and the pressure plate 5 is then mounted on the cope 4. Since, at this time, the diameter of the glass preform 1 is larger than a central thickness of a final lens, the cope 4 projects upwardly from the upper surface 3a of the guide mold portion 3. The lower surface 5b of the pressure plate 5 is in close contact with the upper surface 4a of the cope 4, but is spaced away from the upper surface 3a of the guide mold portion 3. In this connection, the reason why the projection 4b is inserted into the bore 5a in the pressure plate 5 is to prevent the pressure plate 5 from being displaced laterally relative to the upper mold 4 at pressing. This state is illustrated in FIG. 1a.

In this state, the glass preform 1 is heated within the nitrogen atmosphere to bring the viscosity of the glass preform 1 to a value within a range of from $10^8$ to $10^{10.5}$ poises. In the first embodiment, the glass preform 1 is heated to 495 degrees C. in order to bring the viscosity to $10^9$ poises. The pressure plate 5 is then pressed downwardly with force corresponding to 200 kg/cm$^2$, to carry out press-molding for thirty (30) seconds. The cope 4 is pressed by the pressure plate 5 and is moved downwardly while sliding within the guide mold portion 3. The glass preform 1 is pressed and is drawn radially outwardly so that the glass preform 1 is formed into a configuration along the molding surfaces 2c and 4c of the respective drag and cope 2 and 4. As the lower surface 5b of the pressure plate 5 is abutted against the upper surface 3a of the guide mold portion 3, the cope 4 is stopped in downward movement. Thus, the central thickness of the molded lens 1 is determined accurately at this stage. The reason for this is that a load applied to the opposite faces of the molded lens 1 is only the own weight (20 g) of the cope 4 during a cooling step after the pressing subsequently to be described, and the molded lens 1 is not almost pressed by this load. Further, the cope and drag 4 and 2 are guided only by the guide mold portion 3, without the use of a ring-like mold portion, unlike the conventional press-molding device. This makes it possible to reduce the clearance between the guide mold portion 3 and the cope and drag 4 and 2 to an extremely small value. Thus, the decentering of the molded lens 1a is reduced. Moreover, the arrangement of the press-molding device according to the first embodiment is such that the cope 4 is pressed downwardly through the pressure plate 5, in addition to the guidance of the cope and drag 4 and 2 within the guide mold portion 3, and the lower surface 5b of the pressure plate 5 perpendicular to the vertical central axis of the upper mold 4 is abutted against the upper surface 3a of the guide mold portion 3 perpendicular to the vertical central axis of the drag 2, so as to make the upper surface 4a of the cope 4 and the upper surface 3a of the guide mold portion 3 flush with each other accurately. Thus, no lateral force acts upon the cope 4, making it possible to reduce the tilt between the aspheric surface axis of the lower molding surface 2c and the aspheric surface axis of the upper molding surface 4c, that is, a tilt of the shaped lens 1a. This state is illustrated in FIG. 1b.

Figure 2:
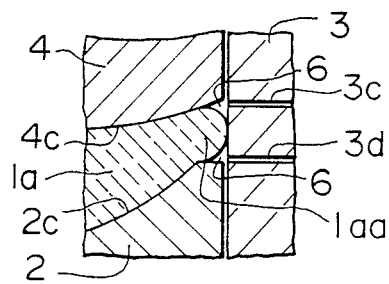
FIG. 2 is an enlarged fragmentary view of a portion of the device illustrated in FIG. 1b.

FIG. 2 shows the state of the peripheral edge portion 1aa of the molded lens 1a at the point of time the pressure plate 5 is abutted against the guide mold portion 3. Gaps 6 and 6 are formed between the peripheral edge portion 1aa of the molded lens 1 and the respective cope and drag 4 and 2. The mold is designed to have such a size that slight gaps 6 and 6 are formed even in case of the largest one of the molded lenses 1a. Variation in the volume of the molded lenses 1a is adapted to be absorbed by the gaps 6 and 6. Thus, it is ensured that the pressure plate 5 is abutted against the guide mold portion 3 at the pressing.

After the above-mentioned press-molding for thirty (30) seconds has been completed, the molded lens 1a is gradually cooled as it is to a temperature level equal to or lower than the glass transition temperature of 435 degrees C. At this time, because of the construction in which the cope 4 is movable relative to the pressure plate 5 and the guide mold portion 3, the cope 4 moves under its own weight, following contraction of the molded lens 1a, so that the contraction of the molded lens 1a is made uniform. Further, since the molding surfaces 4c and 2c of the respective cope and drag 4 and 2 are maintained in contact with the opposite faces of the molded lens 1a, so that heat of the molded lens 1a is permitted to escape from its upper and lower faces respectively to the cope and drag 4 and 2 uniformly. This makes it possible to obtain lenses having high surface accuracy.

The mold is further cooled. Subsequently, the mold is turned upside down. The bore 5a in the pressure plate 5 is utilized to push the drag and cope 2 and 4 up, thereby taking the molded lens 1a out of the mold.

The thus molded lens was high in surface accuracy, 20 seconds in tilt, 5 micrometers in decentering, superior in central thickness accuracy, and 0.023λ rms in spherical aberration. For the purpose of comparison, a mold in which the cope 4 and the pressure plate 5 are integral with each other was used to carry out similar pressing. However, lenses high in surface accuracy could not be obtained, because the cope 4 did not follow contraction of the lens at the cooling.

Figure 3A:
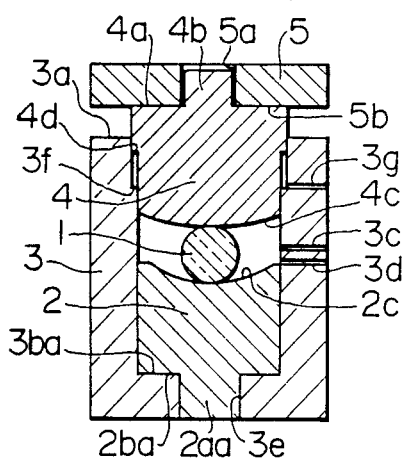
FIGS. 3a and 3b are views similar respectively to FIGS. 1a and 1b, but showing another embodiment of the invention.
Figure 3B:
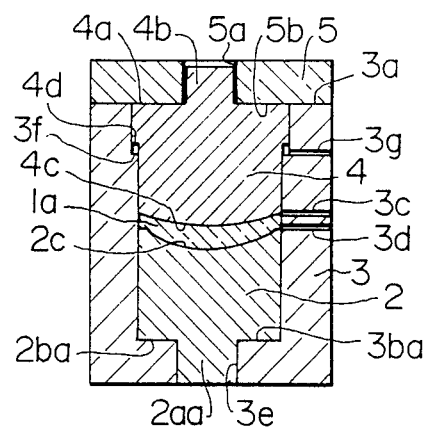

FIGS. 3a and 3b show a lens press-molding device according to a second embodiment of the invention. FIG. 3a illustrates the device before press-molding, while FIG. 3b illustrates the device after the press-molding. Components and parts the same or similar to those of the device shown in FIGS. 1a and 1b are designated by the same reference numerals, and the detailed description of such same or similar components and parts will therefore be omitted to avoid repetition.

The drag 2 has a lower surface 2ba which is formed into a smooth face perpendicular to the vertical central axis of the drag 2. The lower surface 2ba is formed at its center with a projection 2aa which is fitted in a central bore 3e in the bottom wall of the guide mold portion 3. The upper or inner surface 3ba of the bottom wall of the guide mold portion 3 is formed in parallel relation to an upper end surface 3a of the guide mold portion 3. Since the lower surface 2ba of the drag 2 is in close contact with the inner surface 3ba of the bottom wall of the guide mold portion 3, the upper surface 3a of the guide mold portion 3 extends perpendicularly to the vertical central axis of the drag 2. A step 3f is provided at the upper open end section of the guide mold portion 3 so that the upper open end is formed to have a slightly large diameter. A step 4d is provided at an upper section of the cope 4 correspondingly to the step 3f, so that the upper section is formed to have a slightly large diameter. The guide mold portion 3 is formed therein with an air bleed 3g, in addition to the air bleeds 3c and 3d. The cope 4 is fitted in the guide mold portion 3 with a slight clearance, similarly to the embodiment shown in FIGS. 1a and 1b.

When the molded lens 1a is cooled and contracted in the state illustrated in FIG. 3b, the cope 4 moves under its own weight, following the contraction of the molded lens 1a, because of a vertical gap between the step 4d and the step 3f.

The flanged drag 2 shown in FIGS. 1a and 1b may be used in place of the drag 2 shown in FIGS. 3a and 3b. In this case, when the molded lens 1a is taken out of the mold after completion of the molding, the cope 4 is pushed downwardly, whereby the drag 2 can be demounted downwardly from the guide mold portion 3, with the lens 1a resting on the molding surface 2c. At this time, the step 4d of the cope 4 is abutted against the step 3f of the guide mold portion 3, so that the cope 4 is supported by the guide mold portion 3.

Figure 4A:
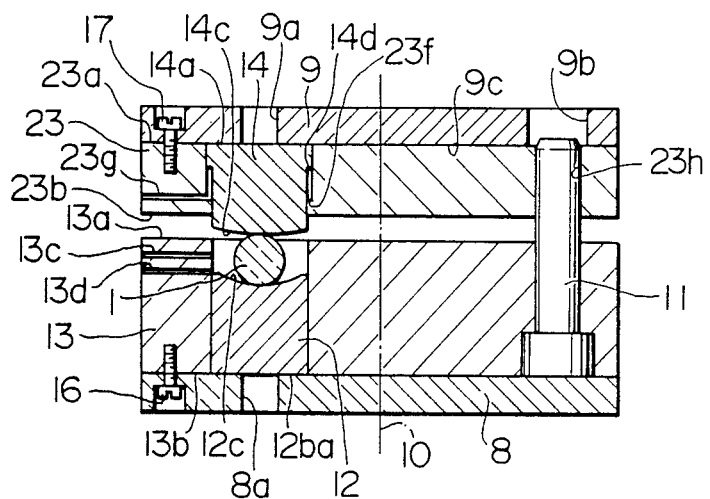
FIGS. 4a and 4b are views similar respectively to FIGS. 1a and 1b, but showing still another embodiment of the invention.
Figure 4B:
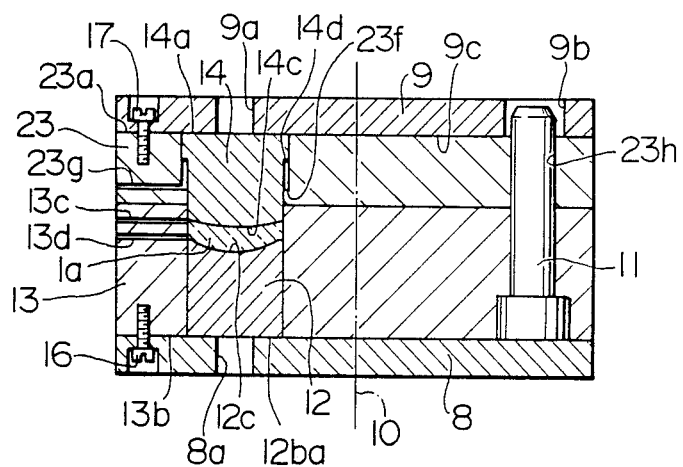
Figure 5:
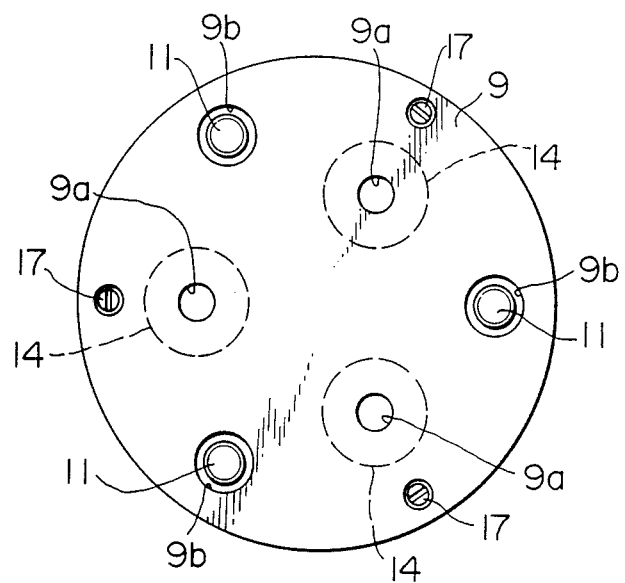
FIG. 5 is a top plan view of the device shown in FIGS. 4a and 4b.
Figure 6:
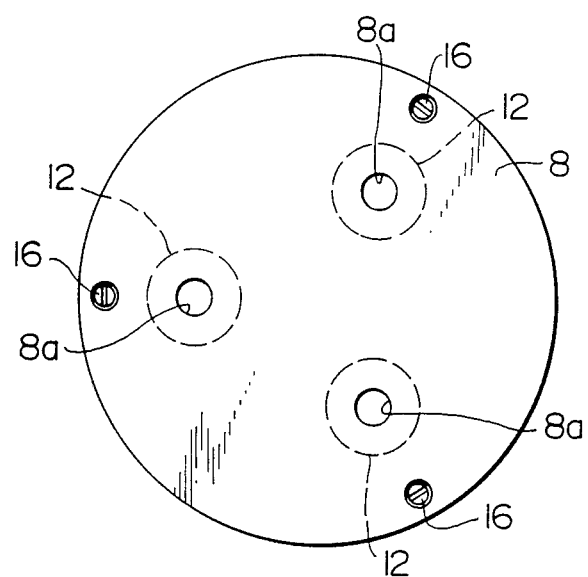
FIG. 6 is a bottom view of the device shown in FIGS. 4a and 4b.

Referring next to FIGS. 4a, 4b, 5 and 6, there is shown a lens press-molding device according to a third embodiment of the invention. FIG. 4a shows the device before press-molding, while FIG. 4b shows the device after the press-molding. FIG. 5 is a top plan view of the device, while FIG. 6 is a bottom view of the device.

The lens press-molding device according to the third embodiment comprises three drags 12, a lower guide mold portion 13, an upper guide mold portion 23 and three copes 14, which are all formed of tungsten carbide similarly to the previous embodiments. The drags 12 are arranged circumferentially about a central axis 10 common to the lower and upper guide mold portions 13 and 23, and are spaced 120 degrees apart away from each other. Likewise, the copes 14 are arranged circumferentially about the central axis 10 and are spaced 120 degrees apart away from each other. Each of the drags 12 cooperates with a corresponding one of the copes 14 to form a mold. Three molds composed respectively by the three pairs of drags and copes 12 and 14 are the same in construction as each other, and only one mold will therefore be described below.

The pair of drag and cope 12 and 14 have their respective molding surfaces 12c and 14c which are formed respectively into spherical faces. The spherical molding surfaces 12c and 14c are so accurately processed as to have their respective radii of curvature whose respective centers are located on a vertical central axis of the mold composed of the pair of drag and cope 12 and 14. A lower surface 12ba of the drag 12 and an upper surface 14a of the cope 14 are formed perpendicularly to the vertical central axis of the mold. The lower guide mold portion 13 has a lower surface 13b which is formed accurately into an smooth face flush with the lower surface 12ba of the drag 12. The lower guide mold portion 13 is fixedly mounted to a support plate 8 by means of screws 16. The cope 12 smaller in vertical or axial length than the lower guide mold portion 13 is accommodated in the latter with a clearance of about 3 micrometers. Thus, an upper surface 13a of the lower guide mold portion 13 is formed perpendicularly to the vertical central axis of the drag 12. Likewise, the upper guide mold portion 23 has a lower surface 23b which is formed accurately into a smooth face parallel to the upper surface 13a of the lower drag 13. The upper guide mold portion 23 is fixedly mounted, by means of screws 17, to a pressure plate 9 having a smooth lower surface 9c. The cope 14 is accommodated slidably in the upper guide mold portion 23 with a clearance of the order of 6 micrometers. Thus, the lower surface 23b of the upper guide mold portion 23 is formed perpendicularly to the vertical central axis of the cope 14. A step 23f formed on the upper guide mold portion 23 and a step 14d formed on the cope 14 cooperate with each other to define a slight gap between the upper guide mold portion 23 and the cope 14.

For each mold, the lower guide mold portion 13 is formed therein with air bleeds 13c and 13d, while the upper guide mold portion 23 is provided therein with an air bleed 23g. For the respective molds, the support plate 8 is formed therein with three air vent holes 8a as shown in FIG. 6 and, likewise, the pressure plate 9 is provided therein with three air vent holes 9a as shown in FIG. 5. The pressure plate 9 is also provided therein with three bores 9b for relief of respective guide posts 11 which are fixedly mounted within the lower guide mold portion 13. The upper guide mold portion 23 is formed therein with three bores 23h in which the three guide posts 11 ar slidably fitted respectively. The upper guide mold portion 23 slides under the guidance of the three guide posts 11, so that three sets of copes and drags 14 and 12 are positioned accurately. Even if the upper guide mold portion 23 and the pressure plate 9 are demounted from the guide posts 11, the three copes 14 are retained by the upper guide mold portion 23.

In operation, the glass preform 1 to be molded is arranged between the molding surfaces 12c and 14c of the respective drag and cope 12 and 14 as shown in FIG. 4a in a manner like that described with reference to the previous embodiments. Subsequently, the press-molding device is heated to 495 degrees C. within the atmosphere of nitrogen gas. The pressure plate 9 is pressed at pressure of 200 kg/cm$^2$ to carry out press-molding for thirty (30) seconds. The upper guide mold portion 23 is moved downwardly until the upper guide mold portion 23 is brought into close contact with the lower guide mold portion 13. This state is shown in FIG. 4b. The press-molding device is gradually cooled to the transition temperature of 435 degrees C., and is further cooled rapidly. Then, the molded lens 1a is taken out of the mold. A tilt between the axes of the spherical molding surfaces 12c and 14c of the respective drag and cope 12 and 14 is restricted to a value within thirty (30) seconds, and decentering is also restricted to an extremely low value of the order of 7 micrometers. At the cooling, the gap between the steps 23f and 14d permits the cope 14 to move following contraction of the molded lens 1a, thereby maintaining the cope and drag 14 and 12 in contact with the molded lens 1a. Thus, heat of the molded lens 1a is permitted to escape from its upper and lower faces respectively to the cope and drag 14 and 12, making it possible to form the opposite faces of the lens 1a with high accuracy. The upper guide mold portion 23 and the pressure plate 9 are then detached from the guide posts 11. Subsequently, the bore 8a in the support plate 8 is utilized to push the drag 12 up, thereby removing the molded lens 1a from the drag 12.

If there is variation in the height dimension accuracy of the cope and drag 14 and 12, a disc-like spacer or spacers may be arranged between the pressure plate 9 and the upper surface 14a of the cope 14 and/or between the support plate 8 and the lower surface 12ba of the drag 12, thereby making it possible to regulate the central thickness of the molded lens 1a.

The arrangement of the third embodiment, in which the guide mold is divided into the pair of upper and lower guide mold portions, has such an advantage as to facilitate setting of the glass preforms into the respective molds and takeout of the molded lenses from the respective molds.

The third embodiment has been described as having the guide posts which are fixedly mounted within the lower guide mold portion. However, the guide posts may be fixedly mounted within the upper guide mold portion, and the lower guide mold portion may correspondingly be formed therein with bores into which the guide posts are inserted respectively.

As described above, according to the lens press-molding device of the invention, a tilt and decentering between the central axes of the respective upper and lower faces of the molded lens can be reduced respectively to low values, and the surface accuracy of the molded lens can also be enhanced. In particular, it is made possible to press-mold, by means of a mold assembly simple in construction, aspheric lenses for which extremely high accuracy or precision is requested in connection with the surface accuracy, the eccentricity, the central thickness and the outer diameter accuracy.

What is claimed is:

1. A press-molding device for lenses, comprising:
a drag having an upper surface formed into a molding surface;
a cope having a lower surface formed into a molding surface, and an upper surface formed into a face substantially perpendicular to a vertical central axis of said cope;
a guide mold portion having an inner peripheral surface in contact with an outer peripheral surface of said drag, said inner peripheral surface having an axial length longer than that of the outer peripheral surface of said drag so that said inner peripheral surface extends upwardly from said mold inner surface of said drag, said cope being capable of sliding along said inner peripheral surface, said guide mold portion having an upper surface formed into a face substantially perpendicular to a vertical central axis of said drag; and a pressure plate in contact with said upper surface of said cope before pressing, and capable of being abutted against said upper surface of said guide mold portion by the pressing, wherein a glass preform to be molded is arranged between said molding surfaces of the respective drag and cope, and said cope is pressed from above through said pressure plate, thereby molding the glass preform to a lens.

2. A press-molding device according to claim 1, wherein said drag is provided with a flange, said guide mold portion being mounted on an upper surface of said flange.

3. A press-molding device according to claim 1, wherein said cope is formed at a center of its upper surface with a projection, and wherein said pressure plate is formed at its center with a bore in which said projection is inserted.

4. A press-molding device according to claim 1, wherein said cope is provided at its outer peripheral surface with a step, and wherein said guide mold portion is provided at its inner peripheral surface with a step which cooperates with said step of said cope.

5. A press-molding device according to claim 1, wherein said guide mold portion is provided therein with air bleed means.

6. A press-molding device for lenses, comprising:

a drag having an upper surface formed into a molding inner surface;

a lower guide mold portion having an inner peripheral surface in contact with said drag, said inner peripheral surface having an axial length longer than that of said lower guide mold portion so that said inner peripheral surface extends upwardly from said mold inner surface of said drag, said lower guide mold portion having an upper surface formed into a face substantially perpendicular to a vertical central axis of said drag;

a cope having a lower surface formed into a molding surface, and an upper surface formed into a face substantially perpendicular to a vertical central axis of said cope, said cope being slidable within said lower guide mold portion;

an upper guide mold portion having lower and upper surfaces formed parallel to each other, said cope being slidable within said upper guide mold portion;

a pressure plate having a lower surface in close contact with said upper surface of said cope and said upper surface of said upper guide mold portion; and guide means for guiding said upper guide mold portion with respect to said lower guide mold portion in such a manner that the vertical central axes of the respective drag and cope are aligned with each other, wherein a lens preform to be molded is arranged between said molding surfaces of the respective cope and drag, and said cope is pressed from above through said pressure plate, thereby molding the glass preform into a lens.

7. A press-molding device according to claim 6, including a plurality of sets of copes and drags, said plurality of sets being arranged in circumferentially spaced relation to each other about a central axis common to said upper and lower guide mold portions.

* * * * *